United States Patent [19]

Kawamoto et al.

[11] 4,346,627
[45] Aug. 31, 1982

[54] SHIFT CONTROL DEVICE FOR AN AUTOMATIC TRANSMISSION

[75] Inventors: Mutsumi Kawamoto; Nobuaki Miki, both of Nagoya, Japan

[73] Assignee: Aisin-Warner K.K., Anjo, Japan

[21] Appl. No.: 86,358

[22] Filed: Oct. 19, 1979

[30] Foreign Application Priority Data

Oct. 28, 1978 [JP] Japan .................. 53/132962

[51] Int. Cl.³ .............................. B60K 41/06
[52] U.S. Cl. ........................ 74/869; 74/861; 74/866; 74/868
[58] Field of Search .............. 74/843, 866, 867, 868, 74/869, 856, 861, 863, 864, 752 A

[56] References Cited

U.S. PATENT DOCUMENTS

| | | | |
|---|---|---|---|
| 3,525,275 | 8/1970 | Lemieux | 74/752 A X |
| 3,691,872 | 9/1972 | Schaefer | 74/864 |
| 3,709,064 | 1/1973 | Schaefer | 74/864 X |
| 3,709,066 | 1/1973 | Burcz | 74/864 X |
| 3,724,292 | 4/1973 | Borman | 74/864 |
| 3,797,330 | 3/1974 | Ushijima | 74/752 A |
| 3,818,783 | 6/1974 | Norris et al. | 74/864 X |
| 3,823,621 | 7/1974 | Kubo et al. | 74/864 X |
| 3,832,915 | 9/1974 | Hiramatsu | 74/869 |
| 3,886,819 | 6/1975 | Lentz | 74/864 X |
| 3,938,409 | 2/1976 | Uozumi | 74/752 A X |
| 3,943,799 | 3/1976 | Sakai et al. | 74/869 X |
| 4,111,072 | 9/1978 | Harmon et al. | 74/864 |
| 4,143,563 | 3/1979 | Shindo et al. | 74/869 X |
| 4,145,937 | 3/1979 | Shindo et al. | 74/869 X |
| 4,148,232 | 4/1979 | Moriya | 74/869 |

FOREIGN PATENT DOCUMENTS 2018740 11/1970 Fed. Rep. of Germany ........ 74/864

Primary Examiner—Leslie Braun
Attorney, Agent, or Firm—Cooper, Dunham, Clark, Griffin & Moran

[57] ABSTRACT

A shift control device for an automatic transmission comprises a pressure hold valve equipped with a pressure oil and an oil chamber wherein said pressure oil is connected to an oil passage being between a shift valve and an oil servo and equipped line pressure is supplied to said oil chamber, and a flow control valve which restricts exhausting of the pressure oil of said pressure hold valve; wherein oil is exhausted through a fore-stage shift valve after the oil pressure of the oil pressure servo to be released is held in the appointed times at the shift where fore-stage engaging elements are disengaged and other engaging elements are allowed to operate without passing through the one-way clutch of an automatic transmission.

10 Claims, 5 Drawing Figures

SHIFT CONTROL DEVICE FOR AN AUTOMATIC TRANSMISSION

BACKGROUND OF THE INVENTION

1. Field of the Invention

The present invention relates to a shift control device for an automatic transmission for automobiles and, more particularly to a shift control device for an automatic transmission, whereby good timing of hydraulic servo operation at shift is obtained and prevention of undesirable shock at the shift is possible.

2. Description of the Prior Art

In a shift control device for an automatic transmission with a torque converter, a number of accumulators are equipped in a hydraulic circuit for the purpose of oil pressure adjustment at a transition stage from the start to the completion of shift. However, the pressure schedule controlled by the accumulator is limited, the optimum hydraulic adjustment is not obtained for the shock prevention for whole operation range.

SUMMARY OF THE INVENTION

It is an object of the invention to provide a shift control device for an automatic transmission with a shock control device.

Another object of the invention is to provide a shift control device for an automatic transmission, whereby good timing of operation of hydraulic servo at shift is obtained.

A further object of the present invention is to provide a shift control device for an automatic transmission, in shift without passing through the one-way clutch, good timing of operation of hydraulic servo at shift is obtained.

DESCRIPTION OF THE PREFERRED EMBODIMENT

Figure 1:
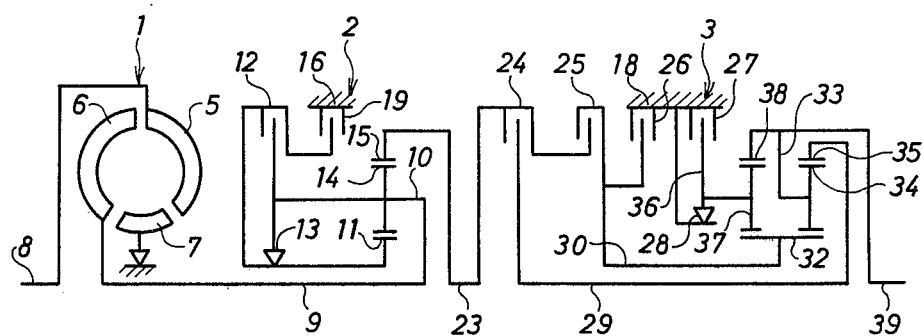
FIG. 1 is a skeleton diagram of the automatic transmission of four forward drives and one rearward drive controlled by an controller of the present invention.

FIG. 1 is a skeleton diagram of an automatic hydraulic transmission of four forward drives and one backward drive with an overdrive device.

Figure 2:
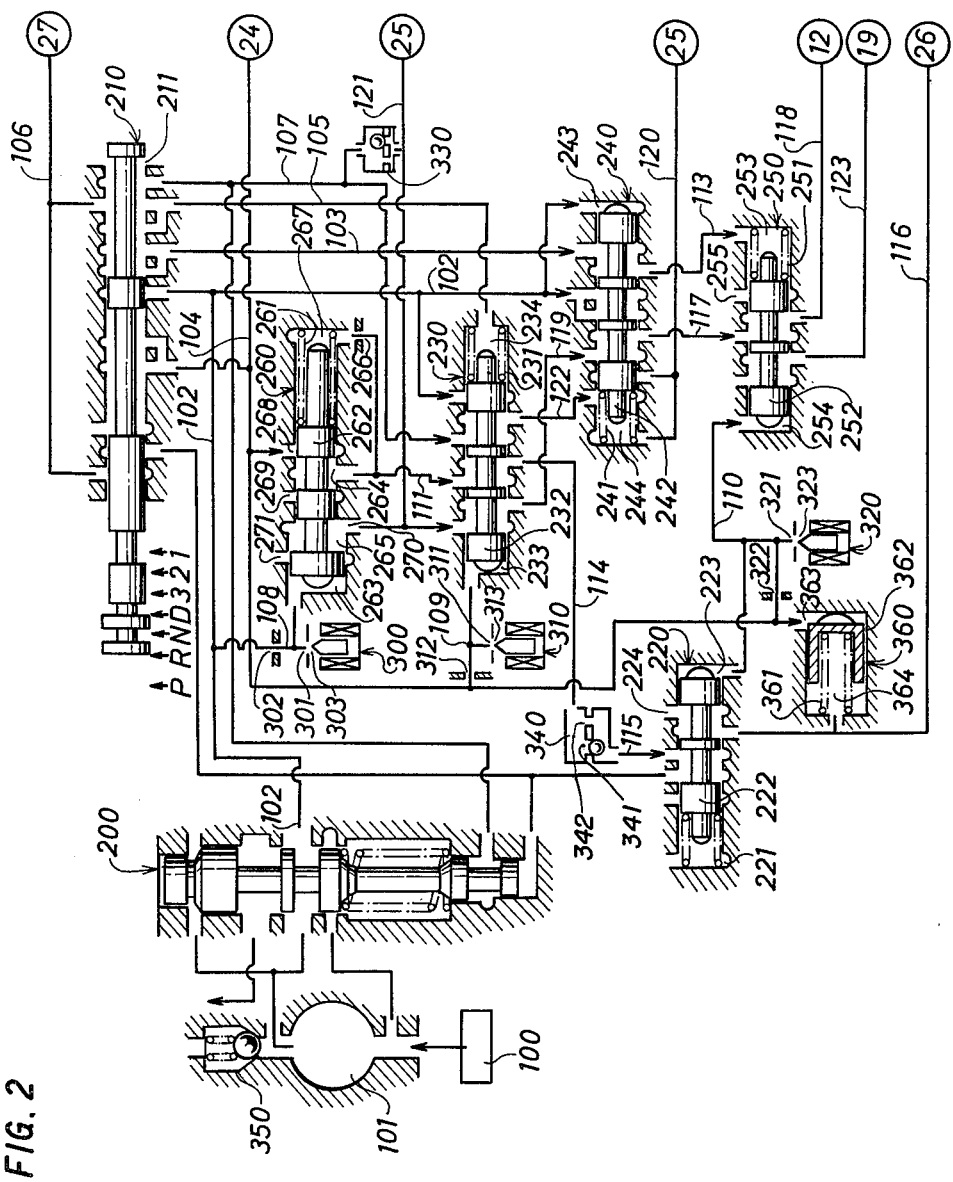
FIG. 2 is an oil pressure circuit diagram of a hydraulic controller showing a preferred embodiment of basic concept of a controller for the automatic transmission of the present invention.

This automatic transmission is equipped with a torque converter 1, an overdrive mechanism 2 and a speed change gear of three forward drives and one backward drive, and is made to be controlled by an oil pressure controller as shown in FIG. 2. The torque converter 1 is a well known one including a pump 5, a turbine 6 and a stator 7, the pump 5 is connected with a crank shaft 8 of an engine and the turbine 6 is connected to a turbine shaft 9. The turbine shaft 9 serves as an output shaft, which also becomes an input shaft of the overdrive mechanism 2, and is connected to a carrier 10 of a planetary gears. A planetary pinion 14 held by a carrier 10 in the possibility of rotation is engaged with a sun gear 11 and a ring gear 15.

A multiple disc clutch 12 and a one-way clutch 13 are installed between the sun gear 11 and the carrier 10, and moreover, a multiple disc brake 19 is installed between the sun gear 11 and a housing or overdrive case 16 including the overdrive mechanism 2.

A ring gear 15 of the overdrive mechanism 2 is connected to an input shaft 23 of the speed change gear 3. A multiple disc clutch 24 is installed between the input shaft 23 and an intermediate shaft 29, in addition to this, a multiple disc clutch 25 is installed between the input shaft 23 and a sun gear shaft 30. A multiple disc brake 26 is installed between the sun gear shaft and a transmission case 18. A sun gear 32 installed on a sun gear shaft 30 constitutes planetary gears of two rows, one of which is composed of a carrier 33, a planetary pinion 34 held by said carrier and a ring gear 35 engaging said pinion and the other is composed of another carrier 36, a planetary pinion 37, and a ring gear 38 engaging said pinion. A ring gear 35 at other planetary gears is connected with an intermediate shaft 29. In addition to this, the carrier 33 at this planetary gears is connected with a ring gear 38 at other planetary gears, and these carrier and ring gear are connected with an output shaft 39. And a multiple disc brake 27 and a one-way clutch 28 are installed between a carrier 36 at said other planetary gears and a transmission case 18.

Such automatic and hydraulic transmission with an overdrive device forms a structure that engagement or disengagement of each clutch and brake is performed by oil pressure controller described in detail hereinbelow in accordance with engine output and vehicle speed, and speed change of four forward speed stages including an overdrive stage (O/D) or speed change of one rearward drive stage by manual changeover is performed.

Table I shows shift position and the operating conditions of the clutches and brakes.

TABLE I

| | Friction engaging unit | | | | | | | |
|---|---|---|---|---|---|---|---|---|
| Shift position | Clutch 12 | Clutch 24 | Clutch 25 | Brake 19 | Brake 26 | Brake 27 | One-way clutch 13 | One-way clutch 28 |
| Parking (P) | 0 | x | x | x | x | 0 | | |
| Reverse (R) | 0 | x | 0 | x | x | 0 | Lock | Lock |
| Neutral (N) | 0 | x | x | x | x | x | | |
| Forward | | | | | | | | |
| D    1st | 0 | 0 | x | x | x | x | Lock | Lock |

TABLE I-continued

| | | Friction engaging unit | | | | | | |
| Shift position | | Clutch 12 | Clutch 24 | Clutch 25 | Brake 19 | Brake 26 | Brake 27 | One-way clutch 13 | One-way clutch 28 |
| --- | --- | --- | --- | --- | --- | --- | --- | --- | --- |
| Range | 2nd | 0 | 0 | x | x | 0 | x | Lock Overrun | |
| | 3rd | 0 | 0 | 0 | x | x | x | Lock | Overrun |
| | O.D | x | 0 | 0 | 0 | x | x | Overrun | Overrun |
| 3 | 1st | 0 | 0 | x | x | x | x | Lock | Lock |
| Range | 2nd | 0 | 0 | x | x | 0 | x | Lock | Overrun |
| 3rd | | 0 | 0 | 0 | x | x | x | Lock | Overrun |
| 2 | 1st | 0 | 0 | x | x | x | x | Lock | Lock |
| Range | 2nd | 0 | 0 | x | x | 0 | x | Lock | Overrun |
| L Range | | 0 | 0 | x | x | x | 0 | Lock | Lock |

Wherein 0 shows that the clutch or brake is engaged and x shows that they are disengaged.

FIG. 2 is a diagram showing one embodiment of the oil pressure control circuit included in the oil pressure controller where the clutches and brakes 12, 19, 24, 25, 26 and 27 of the above-mentioned automatic transmission are operated selectively and at the same time, automatic or manual pressure regulation at speed change (referred to as shift hereinafter) is operated at the controller for an automatic transmission relating to the invention.

This oil pressure control circuit is composed of an oil reservoir 100, an oil pump 101, a pressure regulating valve 200, a manual shift valve 210, a 1-2 shift valve 220, a 2-3 shift valve 230, a 2-3 shift-auxiliary valve 240, a 3-4 shift valve 250, a shift transition control valve 260, a pressure regulating solenoid valve 320, a flow control valve 330, a relief valve 350 and the pressure hold valve 360 and flow control valve 340 of the present invention, and moreover oil passages connecting the interval between various valves.

The oil pumped up by the oil pump 101 from the oil reservoir is fed to the oil passage 102 with it being regulated by the pressure regulating valve 200 to the appointed oil pressure.

The manual shift valve 210 is connected with a shift lever installed on a driver's seat and the speed change gear is shifted by the manual operation of the valve 210 to each position of P, R, N, D, 3, 2, L in accordance with the range of the shift lever.

When a shift lever is at the position N, an oil passage 102 is closed, and only the clutch 12 is engaged. When a shift lever is at the position D, the oil passage 102 is connected to an oil passage 104; when the shift lever is at the positions of 3 and 2, the oil passage 102 is connected to the oil passages 103 and 104; when the shift lever is at the position L, the oil passage 102 is connected to the oil passages 103, 104, 105, and 106; when the shift lever is at the position R, the oil passage 102 is connected to the oil passages 103, 105, 106 and 107.

Figure 4:
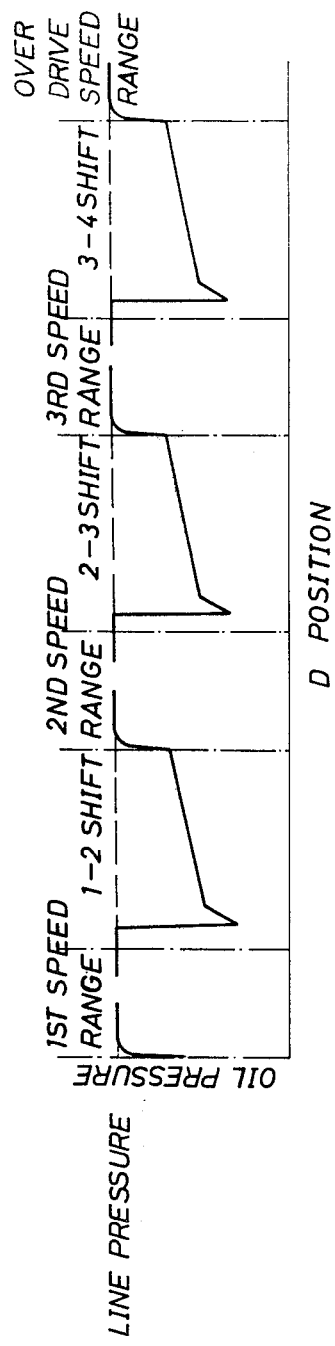
FIG. 4 is a wave form diagram of output oil pressure of a preventive valve against shock.

A pressure regulating solenoid valve 300 performs the operation of make-and-break at the appointed period by the pulse-shaped output at an electric control circuit mentioned later; when power to the solenoid valve 300 is disconnected, oil pressure is allowed to generate in an oil passage 108 connected through an orifice 302 from the oil passage 102 by closing a hole 301; when the valve 300 is energized, oil pressure change of such pattern as shown in FIG. 4 is generated at the shift by exhausting the pressure oil in an oil passage 102 from an oil exhaust port 303 by opening the hole 301.

When power to the 2-3 speed shift solenoid valve 310 is disconnected, oil pressure is allowed to generate at an oil passage 109 connected through an orifice 312 from the oil passage 104 by closing a hole 311; when the solenoid valve 310 is energized, pressure oil in an oil passage 109 is exhausted from an oil exhaust port 313 by opening the hole 311.

When power to the 1-2 speed shift and 3-4 speed shift solenoid valve 320 is disconnected, oil pressure is allowed to generate in an oil passage 110 connected through an orifice 322 from the oil passage 104 by closing a hole 321; when the solenoid valve is energized, pressure oil in the oil passage 110 is exhausted from the exhaust port 323 by opening the hole 321.

Table II shows the relation between the energized or deenergized mode of solenoid valves 310 and 320 and the respective shift condition.

TABLE II

| Shift Position | N | 1 | 2 | 3 | 4 |
| --- | --- | --- | --- | --- | --- |
| Solenoid valve 310 | x | 0 | 0 | x | x |
| Solenoid valve 320 | x | 0 | x | 0 | x |

Wherein 0 shows the energized mode and x shows the de-energized mode.

A shift transition control valve 260 has a spool 262 behind which a spring 261 is installed on one side, a hydraulic oil chamber 263 connected to an oil passage 108, the first pressure oil regulating chamber 264, the second pressure oil regulating chamber 265, and the second hydraulic oil chamber 267, where the oil pressure of the first pressure oil regulating chamber was fed back through an orifice 266; the valve 260 changes the oil pressure pattern generated in the hydraulic oil chamber 263 connected with the above-mentioned oil passage 108 at speed, shift into the position of the spool 262 moved by the oil pressure in said hydraulic oil chamber 263, the oil pressure in the second hydraulic oil chamber 267 and the elastic force of a spring 261; at the forward drive, the valve 260 adjusts the opening area of an oil supply port connected to an oil passage 104 and an oil exhaust port and adjusts the oil pressure in an oil passage 111, in the first pressure oil regulating chamber 264; at the rearward drive, the valve 260 adjusts the opening area of an oil supply port connected with an oil passage 121 connected to an oil passage 107 through a flow control valve 330 and an oil exhaust port 271 and adjusts the oil pressure of the oil passage 121, in the second pressure oil regulating chamber 265; and the valve 260 makes the engagement of a clutch 25 and prevents the shock at the speed shift.

In addition to this, the second hydraulic oil chamber 267 is not always indispensable to the present invention, but the regulating oil pressure pattern at the forward drive can be more positively controlled and the preventive effect against shock at the speed shift is raised, by feeding back the oil pressure in the first pressure regulating chamber 264 to the chamber 267.

A 2–3 speed shift valve has a spool 232 behind which a spring 231 is installed on one side; at the first speed and the second speed, as a solenoid valve 310 is energized and oil pressure is not generated in an oil passage 109, a spool 232 is set to the left side by spring 231 as shown in the figure; at the third speed and the fourth speed, the solenoid valve 310 is deenergized, oil pressure is generated in the oil passage and an oil chamber 233, and the spool 232 is set on the right side shown in the figure.

A 1–2 speed shift valve 220 has a spool 222 behind which a spring 221 is installed on one side; at the first speed and the third speed, a solenoid valve is energized and oil pressure is not generated in an oil passage, so that a spool 222 is set to the right side by spring 221 as shown in the figure; at the second speed and the fourth speed, the solenoid valve 320 is deenergized, oil pressure is generated in the oil passage 110 and an oil chamber 223, and the spool 232 is set on the left side shown in the figure.

A 2–3 speed shift auxiliary valve 240 has a spool 242 behind which a spring 241 is installed; at the first speed and the second speed, oil pressure in an oil passage 102 is supplied to an oil chamber 243, and the spool 242 is set on the left side shown in the figure; at the third speed and the fourth speed, the oil pressure in an oil passage 122 connected with the oil passage 102 enters an oil chamber 244 and the spool 242 is fixed on the right side shown in the figure.

A 3–4 speed shift valve 250 has a spool 252 behind which a spring 251 is installed; at the first speed and the second speed, oil pressure is supplied to an oil chamber 253 from an oil passage 113 connected with the oil passage 102 and the spool 252 is fixed to the left side shown in the figure; at the third speed, the oil passage is connected with an oil passage 113 by the travelling of the spool 242 of the 2–3 speed shift auxiliary valve 240, and if a manual valve 210 is at the position D, the oil pressure of an oil chamber 253 is exhausted; at the fourth speed, the solenoid valve is deenergized, oil pressure is generated in the oil passage 110 and an oil chamber 254 and the spool 252 is set to the right side shown in the figure.

A pressure hold valve 360 has a spool 362 behind which a spring 361 is installed on one side, and is equipped with a pressure oil accumulating chamber 364 connected to an oil passage 116 connecting with a 1–2 speed shift valve 220 and a brake 26 and with an oil chamber 363 connected with an oil passage 104.

A flow control valve 340 is equipped with an orifice 341 with a check valve and a small orifice 342; is connected with the 2–3 speed shift valve 230 through an oil passage 114 and is connected with the 1–2 shift valve 220 through an oil passage 115.

The action of the above-mentioned oil pressure circuit shall be described as follows.

At the position N of a manual valve, solenoid valves 300, 310 and 320 are deenergized, and the line pressure of the oil passage 102 engages a clutch 12 through oil passages 117 and 118. When the manual valve is manually shifted to the position D, at the first speed, pressure oil is supplied to a clutch 24 and the pressure hold valve 360 through the oil passage and the pressure suitable for smoothly engaging the clutch 24 is held for a constant time until the pressure accumulation in an oil chamber 363. At a 1–2 speed shift, a solenoid valve 300 performs make-and-break operation at the appointed period for a constant time, for example, two seconds and oil pressure in the oil chamber 263 changes as shown in FIG. 4; the pressure oil, the pressure of which was regulated in the first pressure oil regulating chamber 264 in accordance with this change in oil pressure, engages a brake 26 through oil passages 111, 114 a flow control valve 340 of the present invention, oil passages 115, 116. In this case, the supply of pressure oil is performed quickly through both of an orifice 341 and orifice 342 of the flow control valve 340. Simultaneously with the engagement of the brake 26, pressure accumulation is commenced in the pressure oil accumulating chamber 364 of the pressure hold valve 360 connected to the oil passage 116 and a spool 362 is transferred by a spring 361 and the oil pressure of an oil passage 116 to the right side shown in the figure.

Figure 5:
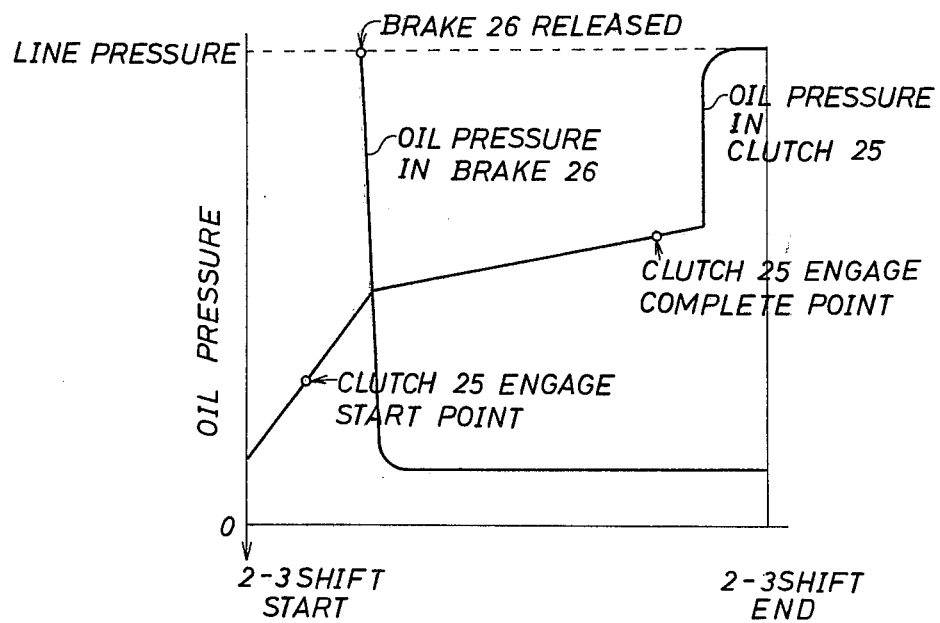
FIG. 5 is a graph showing a change in oil pressure of a hydraulic servo at the hydraulic controller in FIG. 2.

At a 2–3 speed shift, firstly the solenoid valve 310 is deenergized, the spool 232 of the 2–3 speed shift valve transferred to the right side shown in the figure, the oil passage 111 connects to an oil passage 119 and the oil passage 107. The 2–3 speed shift is the shift through no one-way clutch to a clutch from a brake, and it is required to prevent the idling of gears and the shock at the speed shift that the engaging condition of the brake 26 is held for a constant time until the commencement of engagement of a clutch. The area of the small orifice 342 of the flow control valve 340, the volume of the pressure oil accumulating chamber 364, the elastic modulus of the spring 361 is set to suit the shock relief at the speed shift, thus the disengagement of the brake 26 is performed by the process that the engaging condition is held by the small orifice 342 of the flow control valve 340 and the spring 361 and the oil pressure of the oil passage 104 at the pressure hold valve 360 for an optimum time, for example, 0.5 sec; after that the solenoid valve is energized, the spool 222 of the 1–2 speed shift valve is shifted to the right side shown in the figure and the oil passage 116 connects with an oil exhaust port 224. A graph in FIG. 5 shows the change in the oil pressure of each oil pressure servo of a brake 26 and a clutch 25 at the 2–3 speed shift.

At the 2–3 speed shift, the spool 242 of the 2–3 speed shift auxiliary valve 240 is set to the left side shown in the figure, with the line pressure in the oil passage 102 being supplied to the oil chamber 243; the oil passage 119 engages the clutch 25, with the oil passage 119 being connected to the oil passage 120, and moreover the oil passage 102 engages the clutch 12 through the oil passage 118 together with the fixing of the spool 252 of the 3–4 speed shift valve 250 to the left side shown in the figure, with the oil passage 102 being connected to the oil passages 113 and 117. The regulated pressure becomes a line pressure with the rise of pressure when the 2–3 speed shift is completed, and at that time the spool 242 is allowed to travel to the right side shown in the figure by the oil pressure of the clutch 25 and the action of the spring 241. Hereby oil pressure is supplied to the oil chamber 244 from the oil passage 122, so that the spool 242 is fixed to the right side shown in the figure, the oil passage 119 connects with the oil passage 117 and the oil passage 113 connects with the oil passage 103. At the 3–4 speed shift, as the solenoid valve 320 is deenergized, a spool 252 of the 3–4 speed shift valve 250 is shifted to the right side in the figure, the clutch 12 is disengaged, with the oil passage 118 being connected to the oil exhaust port 255, and at the same time the oil passage 123 allows to perform the smooth engagement by supplying an oil brake 19 with oil pressure regulated in the first pressure oil regulating chamber 264 through the oil passages 117 and 119.

At the 4–3 speed shift, the action reverse to the above is performed, and at the 3–2 speed shift, the transmission is shifted down to the 2nd speed stage, with the solenoid valve 320 being deenergized and the solenoid valve 310 being energized and the rotations of an engine and a transmission are synchronized, with oil pressure being regulated by the shift transition control valve 260. Besides, the action reverse to the 1–2 speed shift is performed at the 2–1 speed shift. At the position 3 of the manual valve 210, the shift to the fourth speed stage is abstracted, as the spool 252 of the 3–4 speed shift valve 250 is fixed to the left side shown in the figure, with the line pressure being supplied to the oil chamber 253 through the oil passages 103 and 113, and at the position L of the manual valve 210, the shifts to the 2nd, 3rd and 4th speed stages are not generated, as the spool 232 is fixed to the left side shown in the figure, with the pressure oil is supplied by the oil passage 105 to the oil chamber 234 of the 2–3 speed shift valve. At the position R of the manual valve 210, oil pressure does not enter the oil passages 108 and 109 connected to the solenoid valves 300 and 310, because the pressure oil is not supplied to the oil passage 104, and moreover, oil pressure enters the oil passage 105 and the 2–3 shift valve is set to the left side shown in the figure. As to the oil pressure entering the oil passage 107, the one part enters the oil passage 122, while the other part enters the first piston of the clutch 25 through the oil passage 121, with the oil pressure being regulated in the second pressure oil regulating chamber 265 of the shift transition control valve 260 through the flow control valve 330 and the oil passage 121, and at the same time, smoothly engages the clutch 25 while entering the second piston of the clutch 25 through the oil passages 119 and 120. In addition to this, the oil passage 102 and 106 are connected each other, and the brake is engaged before the clutch is engaged.

Figure 3:
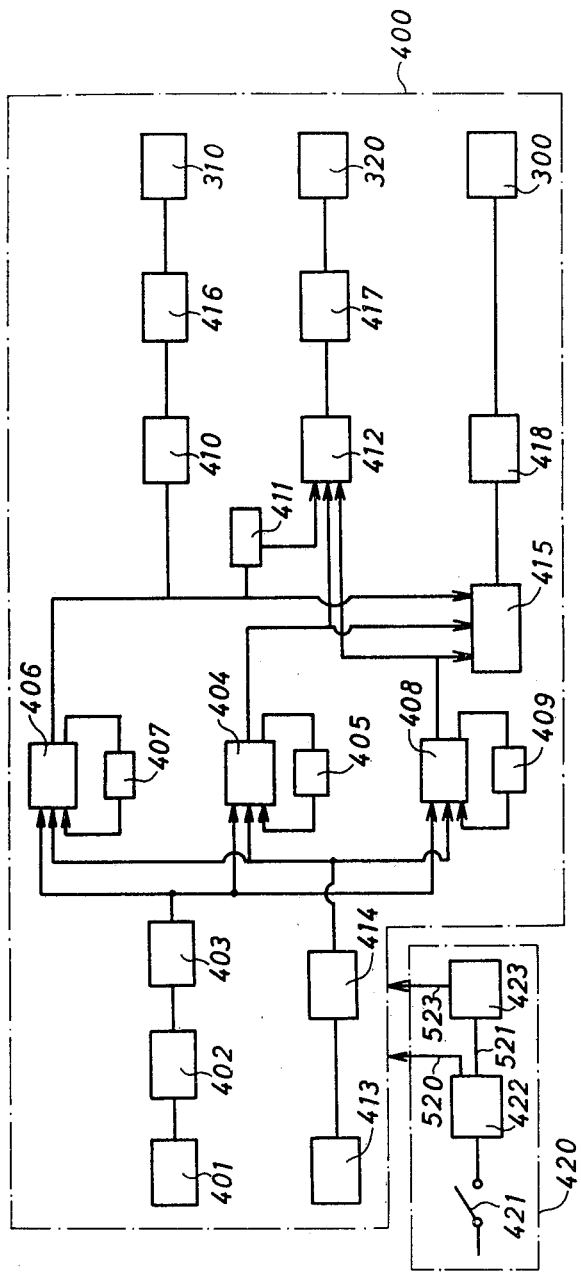
FIG. 3 is a block diagram of an electric controller of a controller for the automatic transmission controlling the hydraulic controller in FIG. 2.

In the next place, an electric control circuit performing the operation of the make-and-break of the solenoid 300, 310 and 320 shall be described on the basis of one preferred example shown in FIG. 3.

The electric control device is composed of a power supply 420 and a computer circuit 400 to the driving devices of solenoid valves 300, 310 and 320 from the detecting device of vehicle speed and throttle opening. The power supply 420 sets the positions of D, 3, 2, and L through a wiring 520 from a position switch 422 installed on a manual lever, with the power supply 420 being connected to a battery through a switch 421, and a power supply 423—constant voltage power supply—is conducted by a wiring 521, constant pressure being supplied to each component of the computer circuit 400 through a wiring 523 from said power supply 423.

The computer circuit 400 is composed of a vehicle speed detecting device 401, a waveform amplifying and shaping circuit 402, a D-A (Digital-Analog) conversion circuit 403, a throttle position switch 413, a throttle opening pressure generating circuit 414, a 1–2 speed shift discriminating circuit 404, a 2–3 speed shift discriminating circuit 406, a 3–4 speed shift discriminating circuit 408, hysteresis circuits 405, 407 and 409, a decision circuit 410 of make-and-break of a solenoid valve 310, a timer 411, a decision circuit 412 of make-and-break of a solenoid valve 320, a decision circuit 415 of pressure regulating waveform, amplifiers 416, 417 and 418, and solenoid valves 300, 310 and 320. Vehicle speed detected by the vehicle speed detecting device 401 becomes a sinusoidal waveform signal, which is shaped and amplified by the waveform amplifying and shaping circuit 402 to apposition rectangular wave signal and is converted into a positive DC voltage signal according to the vehicle speed by the D-A conversion circuit 403; the throttle position switch 413 detecting the condition of engine load is composed by variable resistance according to the throttle opening and the signal according to the throttle opening is converted into DC voltage by the throttle opening voltage generating circuit 414; the positive DC voltage signal and the DC voltage enter the 1–2 speed shift discriminating circuit 404, the 2–3 speed shift discriminating circuit 406, and the 3–4 speed shift discriminating circuit 408, respectively. Each discriminating circuit sets any condition of the 1–2 shift, the 2–3 shift and the 3–4 shift by the comparison of the size of a vehicle speed voltage signal and a throttle opening voltage signal, for example, at a differential amplification circuit.

Hysteresis circuits 405, 407 and 409 are the ones for the purpose of giving the condition of each shiftdown of 2–1, 3–2 and 4–3, respectively, and they prevent the hunting at the speed change area, with the shiftdown being performed at the side slightly lower in vehicle speed than the speed change point at the respective shiftup. The decision circuit 410 of make-and-break of a solenoid valve allows to perform the operation of the make-and-break of the solenoid valve 310 through an amplifier 416; the decision circuit 412 by making the output of 0 (OFF) or 1 (ON) by the output of the 2–3 speed shift discriminating circuit; the decision circuit 412 of make-and-break of a solenoid valve allows to perform the operation of make-and-break of the solenoid valve 320 through the amplifier 417, by making the output of 0 or 1 by the output of the 1–2 speed shift discriminating circuit 404 and the 3–4 speed shift discriminating circuit 408, and by the output of the 2–3 speed shift discriminating circuit 406 through the timer 411. The decision circuit 415 of pressure regulating waveform allows to perform the operation of make-and-break of the pressure regulating solenoid valve 300 at the appointed period through the amplifier 418, by sending the appointed pulse for a constant time up to the shift completion by the output of each speed shift discriminating circuit of 1–2, 2–3 and 3–4.

Since oil pressure regulation for the purpose of the shift transition control valve 260 against shock in the respective separated pressure regulating chambers 265 and 264 at the forward drive and the rearward drive, oil passage where oil pressure is transmitted at the forward drive and the rearward drive, is separated, for example, it can be positively prevented by valve stick and others that the oil pressure regulation for the prevention against shock to be performed at the rearward drive is performed at the forward drive, the malfunction of an oil pressure circuit is prevented, and the oil pressure regulation effective to the prevention against shock is easy to be performed. Moreover, oil pressure regulation can be performed more precisely at the forward drive and the preventive effect against shock is more raised by having the second hydraulic oil chamber 267 to which the oil pressure of the first pressure regulating chamber 264 was fed back.

The holding of oil pressure of an oil pressure servo to be exhausted for the appointed times at shift by the pressure hold valve 360 and the flow control valve 322 makes the prevention against idling of gears possibly, and makes the relaxation of shock at shift also effective due to the smoothness of the shift.

We claim:

1. A shift control device for a vehicle with an automatic transmission having a gear system provided with a plurality of friction engaging means for selecting a plurality of gear ratios according to vehicle running conditions, comprising:

an electric control circuit comprising signal generating means for generating an electric signal in accordance with the vehicle running conditions and a logic circuit for receiving said electric signal and generating an electric output signal corresponding to one of the gear ratios; and a hydraulic pressure control system comprising hydraulic servo means to operate said plurality of friction engaging means, a source of line pressure, a shift valve operable between first and second positions, said shift valve supplying hydraulic operating pressure to said hydraulic servo means through a fluid passage, a solenoid valve to control the position of said shift valve in response to the electric output signal of said electric control circuit, a pressure hold valve connected to said fluid passage between said shift valve and said hydraulic servo means, said pressure hold valve responsive to hydraulic line pressure and to hydraulic operating pressure supplied by said shift valve, and a flow control valve in fluid communication with said pressure hold valve, said flow control valve restricting discharge of hydraulic operating pressure from said pressure hold valve whereby discharge of hydraulic operating pressure from said hydraulic servo means is restrained and said friction engaging means remains engaged for an appointed time.

2. The shift control device of claim 1 wherein said shift valve receives hydraulic operating pressure from said flow control valve when in the first position and discharges hydraulic operating pressure from said hydraulic servo means through an exhaust port when in the second position.

3. The shift control device of claim 2 further comprising a shift transition control valve, said shift transition control valve receiving line pressure from said source of line pressure and supplying hydraulic operating pressure to said shift valve.

4. The shift control device of claim 3 further comprising a second solenoid valve to control the position of said shift transition control valve in response to the electric output signal of said electric control circuit.

5. The shift control device of claim 4 wherein the pressure hold valve comprises a first chamber to receive line pressure, a second chamber to accumulate hydraulic fluid from the fluid passage connecting the shift valve and the hydraulic servo means, a spool responsive to line pressure and hydraulic operating pressure and biasing means to bias said spool against the line pressure.

6. The shift control device of claim 5 wherein said flow control valve receives hydraulic operating pressure from said shift transition control valve and supplies it to said shift valve.

7. The shift control device of claim 6 wherein said flow control valve comprises a chamber divided in two by a partition, said partition having an orifice with a check valve to restrict discharge of hydraulic operating pressure from said pressure hold valve.

8. The shift control device of claim 8 wherein said partition has a second unrestricted orifice.

9. The shift control device of claim 8 wherein said shift valve comprises a 1-2 shift valve.

10. The shift control device of claim 9 further comprising a 2-3 shift valve, a third solenoid valve to control the position of said 2-3 shift valve in response to the electric output signal of said electric control circuit, and a 3-4 shift valve, the position of said 3-4 shift valve controlled by said first solenoid valve.

* * * * *